(12) United States Patent
Roper

(10) Patent No.: US 9,001,991 B1
(45) Date of Patent: Apr. 7, 2015

(54) CONVEYING IN-APPLICATION BEHAVIOR VIA A TELEPHONE

(75) Inventor: Colin J. Roper, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 109 days.

(21) Appl. No.: 13/444,015

(22) Filed: Apr. 11, 2012

(51) Int. Cl.
*H04M 3/00* (2006.01)

(52) U.S. Cl.
CPC ..................... *H04M 3/226* (2013.01)

(58) Field of Classification Search
USPC ........... 379/265.01, 265.09, 266.01; 455/419, 455/410, 411
See application file for complete search history.

(56) References Cited

U.S. PATENT DOCUMENTS

| | | | | |
|---|---|---|---|---|
| 5,898,919 A * | 4/1999 | Yuen | ............................. | 455/420 |
| 6,195,426 B1 * | 2/2001 | Bolduc et al. | ............ | 379/266.01 |
| 6,871,072 B1 * | 3/2005 | Meche | .......................... | 455/445 |
| 7,117,529 B1 * | 10/2006 | O'Donnell et al. | ............... | 726/6 |
| 7,149,514 B1 * | 12/2006 | DePani et al. | ............. | 455/426.2 |
| 7,580,699 B1 * | 8/2009 | Shaw et al. | ................... | 455/410 |
| 7,835,951 B1 * | 11/2010 | Burger et al. | ................... | 705/28 |
| 8,429,088 B2 * | 4/2013 | Kaplan et al. | .................. | 705/305 |
| 8,473,604 B2 * | 6/2013 | Misra et al. | .................... | 709/224 |
| 2003/0014267 A1 * | 1/2003 | Culp | ................................ | 705/1 |
| 2005/0080718 A1 * | 4/2005 | Desai | .............................. | 705/38 |
| 2006/0062375 A1 * | 3/2006 | Pasquale et al. | ......... | 379/265.12 |
| 2006/0229054 A1 * | 10/2006 | Erola et al. | ..................... | 455/403 |
| 2007/0156846 A1 * | 7/2007 | Seward | ......................... | 709/219 |
| 2010/0073453 A1 * | 3/2010 | Velarde et al. | ............. | 348/14.02 |
| 2010/0158236 A1 * | 6/2010 | Chang et al. | ............. | 379/265.03 |
| 2012/0102304 A1 * | 4/2012 | Brave | ................................ | 713/1 |
| 2012/0210134 A1 * | 8/2012 | Mitter | ........................... | 713/171 |
| 2012/0309351 A1 * | 12/2012 | Dutta | ............................ | 455/411 |
| 2012/0320903 A1 * | 12/2012 | Ilagan | ............................ | 370/352 |

* cited by examiner

*Primary Examiner* — William Deane, Jr.
(74) *Attorney, Agent, or Firm* — Park, Vaughan, Fleming & Dowler LLP; Steven E. Stupp

(57) ABSTRACT

In response to a user instruction, an electronic device contacts a representative associated with a software application (such as customer support or sales) using a telephone number of the representative. In addition, the electronic device provides an identifier via a telephone connection with the representative to specify the information about the user known to a provider of the software application to allow the representative to access the information. For example, the identifier may include a numerical value (such as an extension), and providing the identifier may involve appending the numerical value to the telephone number prior to the establishment of the telephone connection with the representative. Alternatively or additionally, the identifier may be provided after the telephone connection is established with the representative.

14 Claims, 5 Drawing Sheets

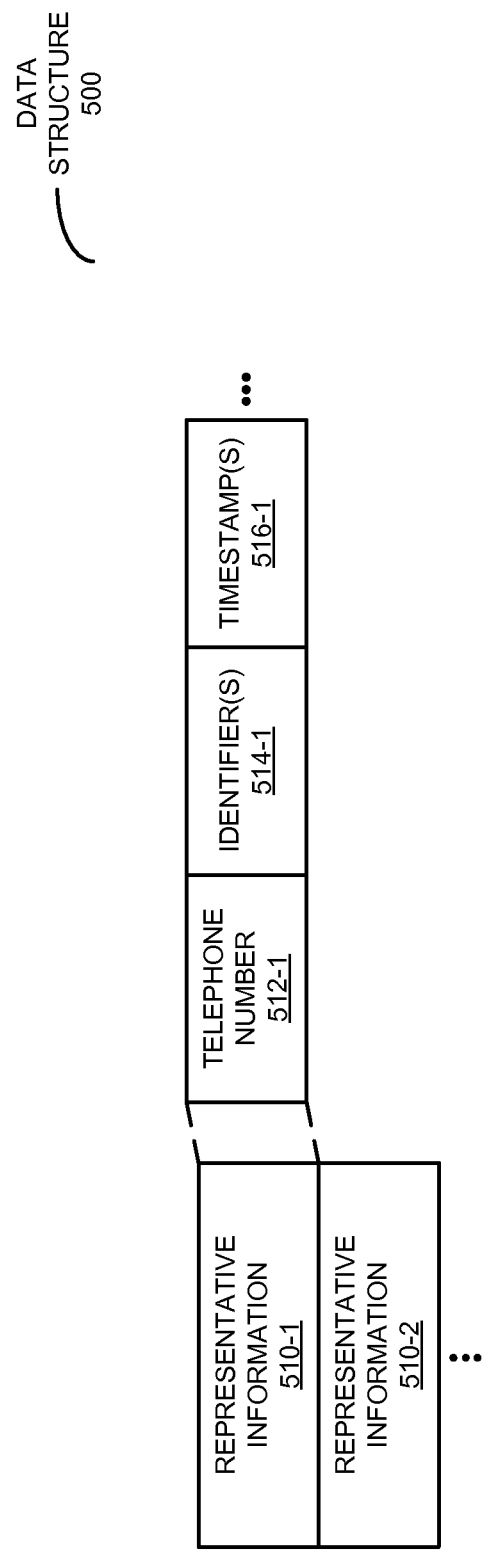

CONVEYING IN-APPLICATION BEHAVIOR VIA A TELEPHONE

BACKGROUND

The present disclosure relates to techniques for conveying information about a customer of a software product. More specifically, the present disclosure relates to a technique for conveying information about the customer to a representative associated with the software product through a telephone system.

Users of a software product often contact representatives of a provider of the software product to obtain information or assistance. For example, a user may contact customer-support agent when they encounter a problem or a support question, or a potential customer may contact a sale agent when they are interested in purchasing a service.

However, when an agent in a call center first receives a phone call for a user or a potential customer (referred to as a 'caller'), they typically do not know anything about the caller, such as who they are, why they are calling or what they were recently doing with the software application. The caller usually needs to explain all of this information over the telephone before the agent can assist them, all of which can test the caller's patience and wastes valuable agent time which, in turn, increases the cost of maintaining a telephone support channel. Currently, the best the agent can often do is use a customer management system to identify the caller's telephone number, which can be used to access associated account information, thereby accelerating the support process.

SUMMARY

The disclosed embodiments relate to an electronic device that facilitates communicating information about a user of a software application. During operation, the electronic device receives a user instruction to contact a representative associated with the software application. Then, the electronic device contacts the representative using a telephone number of the representative. Moreover, the electronic device provides an identifier via a telephone connection with the representative to specify the information about the user known to a provider of the software application to allow the representative to access the information.

For example, the identifier may include a numerical value (such as an extension), and providing the identifier may involve appending the numerical value to the telephone number prior to the establishment of the telephone connection with the representative. Alternatively or additionally, the identifier may be provided after the telephone connection is established with the representative.

Note that the representative may include customer support or sales. Furthermore, the information may include a customer identifier and a transaction history.

In some embodiments, the identifier is pre-determined by the provider of the software application prior to a current session in which the user uses the software application. Alternatively, the electronic device may receive the identifier, which is dynamically generated, from the provider of the software application in response to: the user accessing a document (such as a web page) associated with the software application; or the user initiating a current session in which the user uses the software application.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

FIG. 5 is a block diagram illustrating a data structure for use with the electronic device of FIG. 4 in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for facilitating communication of information about a user of a software application, and a computer-program product (e.g., software) for use with the electronic device are described. In response to a user instruction during this communication technique, the electronic device contacts a representative associated with the software application (such as customer support or sales) using a telephone number of the representative. In addition, the electronic device provides an identifier via a telephone connection with the representative to specify the information about the user known to a provider of the software application to allow the representative to access the information. For example, the identifier may include a numerical value (such as an extension), and providing the identifier may involve appending the numerical value to the telephone number prior to the establishment of the telephone connection with the representative. Alternatively or additionally, the identifier may be provided after the telephone connection is established with the representative.

In this way, the communication technique may facilitate improved customer service. In particular, the representative may use the identifier to access the information (such as customer identifier and a transaction history) prior to speaking with the user, which may allow the representative to rapidly and accurately address the user's needs. This improved customer service may increase customer loyalty and retention. It may also improve the efficiency of the representative in handling customer requests, thereby reducing the overhead associated with customer support.

In the discussion that follows, a user may include: an individual (for example, an existing customer, a new customer, a service provider, a vendor, a contractor, etc.), an organization, a business (such as a merchant) and/or a government agency. Furthermore, a 'business' should be understood to include: for-profit corporations, non-profit corporations, organizations, groups of individuals, sole proprietorships, government agencies, partnerships, etc.

Figure 1:
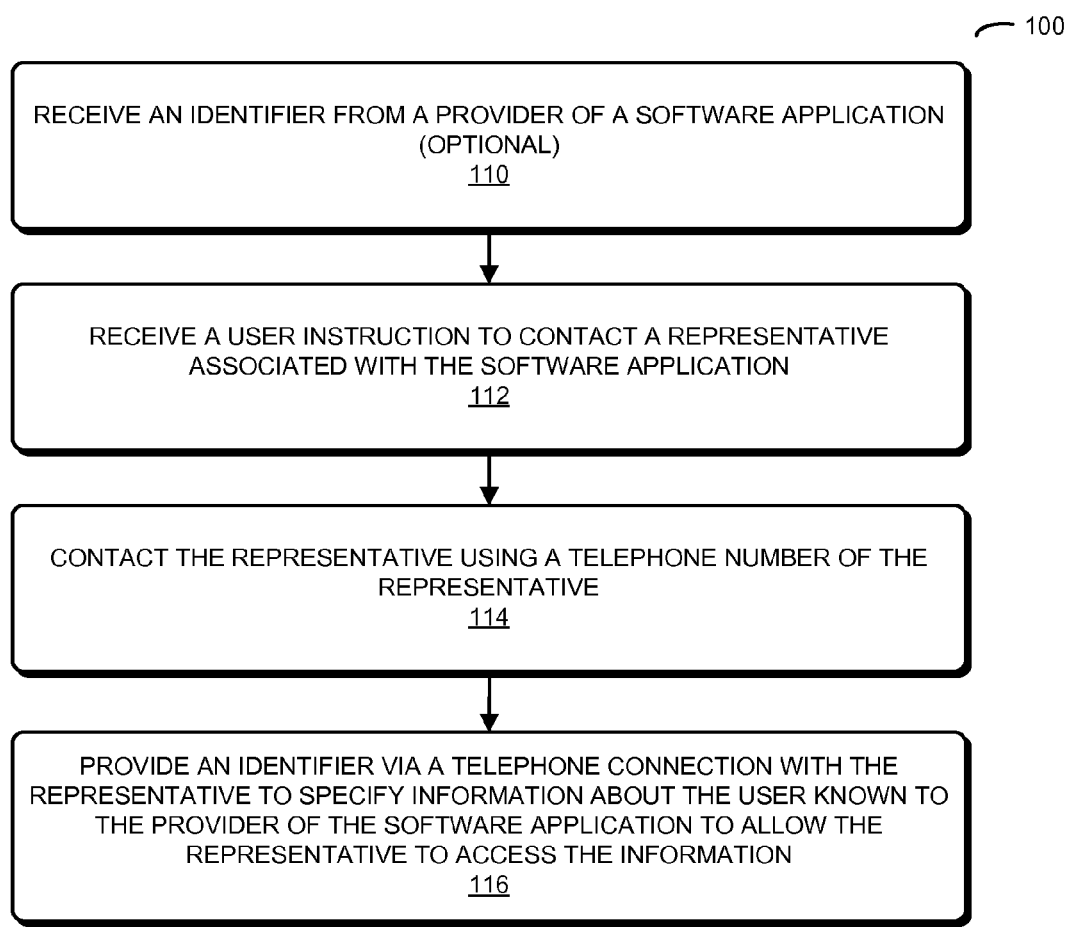
FIG. 1 is a flow chart illustrating a method for providing an identifier to specify information about a user known to a provider of a software application in accordance with an embodiment of the present disclosure.

We now describe embodiments of the communication technique. FIG. 1 presents a flow chart illustrating a method 100 for facilitating communication of information about a user of a software application, which may be performed by an electronic device (such as electronic device 400 in FIG. 4). During operation, the electronic device receives a user instruction to contact a representative associated with the software application (operation 112), such as customer support or sales.

Then, the electronic device contacts the representative using a telephone number of the representative (operation 114). Moreover, the electronic device provides an identifier via a telephone connection with the representative to specify the information about the user known to a provider of the software application to allow the representative to access the information (operation 116). For example, the information may include a customer identifier and a transaction history (such as a record of at least the user's recent activities when using the software application). Moreover, using the identifier, the representative may look up the information so they can assist the user more effectively and efficiently, thereby providing a surprising (even delightful) user experience.

In some embodiments, the identifier includes a numerical value (such as an extension), and providing the identifier involves appending the numerical value to the telephone number prior to the establishment of the telephone connection with the representative. Alternatively or additionally, the identifier may be provided after the telephone connection is established with the representative.

In some embodiments, the identifier is pre-determined by the provider of the software application prior to a current session in which the user uses the software application. Alternatively, the electronic device may optionally receive the identifier, which can be dynamically generated, from the provider of the software application (operation 110) in response to: the user accessing a document (such as a web page) associated with the software application; or the user initiating a current session in which the user uses the software application. Furthermore, in some embodiments the electronic device (or the software application executing on the electronic device) generates the identifier and provides it to the provider of the software application (e.g., to a server associated with the provider).

For example, when the user accesses a customer-support web page for the software application, an identifier may be dynamically generated in real time (e.g., immediately) and provided to the software application executing on the electronic device. Alternatively, if the user activates a 'contact customer support' icon on the customer-support web page, the identifier may be dynamically generated in real time and provided to the software application executing on the electronic device. In either case, the software application may then display the telephone number for customer support along with the identifier on a display on the electronic device. Note that a dynamically generated identifier may be valid for a finite amount of time (such as one hour or a duration of the user's current session).

Figure 2:
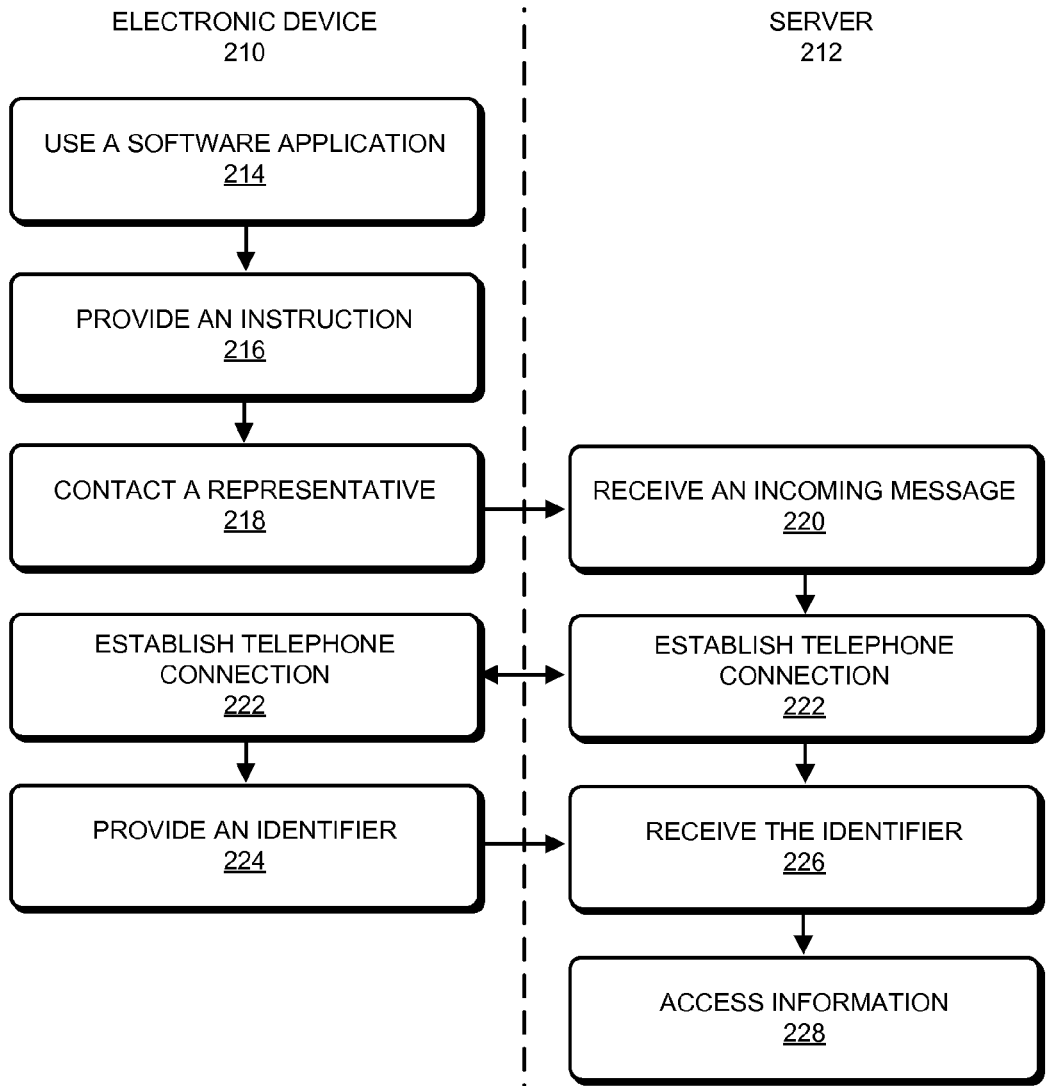
FIG. 2 is a flow chart illustrating the method of FIG. 1 in accordance with an embodiment of the present disclosure.

In an exemplary embodiment, the communication technique is implemented using an electronic device (such as a cellular telephone or a computer) and at least one server (which is associated with and is used by the representative), which communicate through a network, such as a cellular-telephone network and/or the Internet (e.g., using a client-server architecture). This is illustrated in FIG. 2, which presents a flow chart illustrating method 100 (FIG. 1). During this method, a user (such as a consumer) of electronic device 210 may use a software application (operation 214). If the user encounters a problem, the user may provide an instruction (operation 216) to electronic device 210 to contact a representative associated with the software application (operation 218), such as customer support or sales.

In response to the instruction, electronic device 210 contacts the representative (218) using a telephone number of the representative. For example, the software application (or a communication module in electronic device 210) may dial the telephone number or use Voice over Internet Protocol (VoIP) to contact the representative. After receiving the incoming message (operation 220), a telephone connection (and, more generally, a communication link) between electronic device 210 and server 212 is established (operation 222).

Then, electronic device 210 provides an identifier (operation 224) via the telephone connection with the representative to specify information about the user known to the provider of the software application. Moreover, server 212 may receive the identifier (operation 226), and the identifier may be used to access the information (operation 228). For example, using the identifier, the information may be looked up in a data structure. Using this information, the representative may be able to efficiently and effectively assist the user.

In some embodiments of method 100 (FIGS. 1 and 2), there may be additional or fewer operations. Moreover, the order of the operations may be changed, and/or two or more operations may be combined into a single operation. For example, in some embodiments the representative may call or contact the user, and the user may then (directly or indirectly, such as via the software application) provide the identifier to the representative to assist the representative in helping the user.

In an exemplary embodiment, the identifier is appended to the telephone number of the representative. For example, the user may manually enter the telephone number followed by an instruction for a 'pause' and then an extension (such as a numerical value that represents the identifier). Alternatively, the telephone number and the extension may be stored in one field or two related fields in a data structure.

When the telephone number is dialed by a communication application or module that executes on the electronic device, the telephone number may be processed first. Then, after the telephone connection has been established, the communication module may process the extension, and may provide it to the representative (or a server used by the representative).

Alternatively, the telephone number and the extension may be provided by the user (either directly by typing in the values, or indirectly via the communication module), and the telephone number and the extension (as well as any other instructions, such as a 'pause') may be communicated to the representative when the telephone number is dialed. Thus, the identifier may be provided before the telephone connection is established (or concurrently with the establishment of the telephone connection). In this case, the extension may be processed, parsed or translated from the telephone number by the representative (or the server used by the representative).

In some embodiments, the extension is not processes as an 'extension,' per se, but may be presented to the user. For example, when contacting customer support a prompt may be displayed, such as: "tap to call this telephone number, and then you'll be prompted to enter this code." After the phone connection has been established, and while the user waits on hold, the hold message may indicate: "if you have a call code [i.e., the extension], please type it now, otherwise wait on the line and an assistant will be with you shortly." In this way, the extension (or the associated information) can also be provided to the representative (or the server).

In an exemplary embodiment, a customized extension number is appended to the end of a telephone number of the representative that is presented to the user on a portable electronic device. This customized extension may be related to or otherwise encode key information about the user and their recent activities. The user may tap or enter the telephone number and the customized extension number on a physical or virtual keypad on their portable electronic device to initialize the telephone call to the representative. After the telephone connection is established with the representative, the relationship/encoding may be translated by the representative's customer management phone system.

For example, useful information for the representative may be stored in a data structure (or a look-up table) along with the identifier (such as the customized extension number). This information may include: a company identifier (so the agent can look up account information) and the error code for any error messages that were triggered by the software application in the last five minutes. However, a wide variety of information or data may be included in the data structure.

Then, the identifier may be created by a coding system. This identifier may be provided to the software application executing on the electronic device, so that it can be appended to the telephone number as an extension. For example, the identifier may have a format of 'XXXXXYYYY', where 'XXXXX' is the company identifier, and 'YYYY' is the most recent error code presented to the user (if no error code was presented, there may not be any 'Y' values). Thus, if user A's company identifier is '12345,' and they just had an error message with the code '7777,' the extension appended to the telephone number would be '123457777.'

An in-application communication module executing on the portable electronic device may use the aforementioned identifier. In particular, the in-application communication module may make sure that the extension is applied when user A activates a 'call support' icon (i.e., the telephone number and the extension may be presented to the user as a single button or icon for the user to tap and call, and the in-application communication module may interpret the telephone number and the extension. Thus, the in-application communication module may launch a telephone application, and may default to the telephone number '1-800-555-5555 ext. 123457777' instead of just '1-800-555-5555.'

Furthermore, the coding system may be integrated into the representative's customer-management phone system. For example, many support agents use a tool, such as a customer relationship interface system (CRIS). This tool is often designed to pre-populate information based on the telephone number of the caller. Using an add-on to this system (or by creating a new system), the tool may be able to interpret the extension and the coding associated with the coding system.

Thus, if user A is logged into a mobile application, the mobile application may know that user A's company identifier is '12345.' At some point when using the mobile application, user A may see an error message 'Warning: memory leak,' which has an error code (that is not presented to the user) of '7777.' In response to the error message, user A may activate a 'Contact us by telephone' icon in the mobile application. This may launch a native telephone application with a pre-populated telephone number. However, this telephone number may include an extension 'ext. 123457777. Then, user A may activate the call button or icon.

A customer-support agent may receive the telephone call. The agent's CRIS would parse or process the extension. In particular, the first five digits may be processed as a company identifier, and the agent's screen may be automatically switched to the corresponding company. In addition, another window may highlight that the user saw error '7777,' and may display relevant information to the agent about this error code.

In this way, the agent would be able to quickly address the customer's issue, thereby increasing customer satisfaction.

Note that the preceding example of the coding of the identifier is intended to be an illustration. A wide variety of coding techniques may be used. Furthermore, in some embodiments, the coding of the identifier may be performed in real time if the mobile application is coupled to the back-end customer management system in server 212 (FIG. 2). For example, when user A activates 'contact support,' the back-end customer management system may randomly (or pseudo-randomly) generate an extension code that is tied to user A and their recent operations and activities in the mobile application (such as those in the last hour, day or week). This code and the user behaviors (or the transaction history) may be hosted on server 212 (FIG. 2) and the customer management system may have access to it. Thus, when the customer management system receives a telephone call from an unknown user with an extension, it can access this data structure to find the extension code, and then is able to match that code to a body of information about the user.

Figure 3:
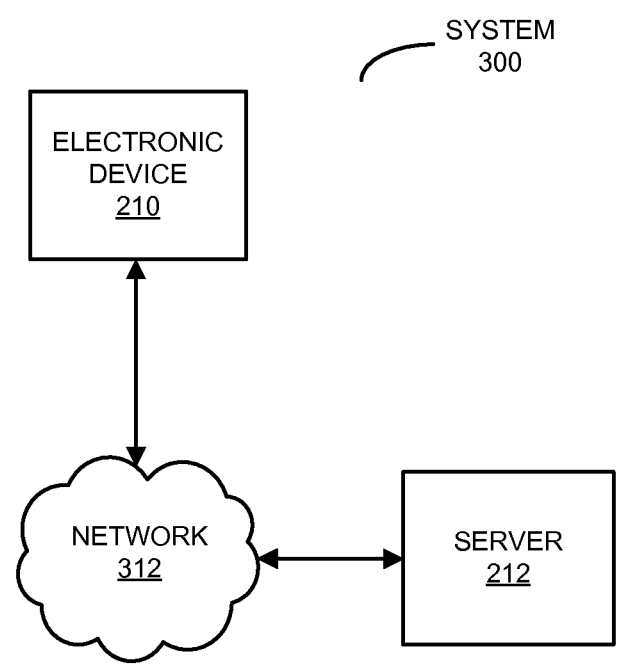
FIG. 3 is a block diagram illustrating a system that performs the method of FIGS. 1 and 2 in accordance with an embodiment of the present disclosure.

We now describe embodiments of the system and the electronic device, and their use. FIG. 3 presents a block diagram illustrating a system 300 that performs method 100 (FIGS. 1 and 2). In this system, a user of electronic device 210 may use a software application or product, such as a financial software application that is resident on and that executes on electronic device 210. (Alternatively, the user may interact with a web page that is provided by server 212 via network 312, and which is rendered by a web browser on electronic device 210. For example, at least a portion of the financial software application may be an application tool that is embedded in the web page, and which executes in a virtual environment of the web browser. Thus, the application tool may be provided to the consumer via a client-server architecture.) This financial software application may be a standalone application or a portion of another application that is resident on and which executes on electronic device 210 (such as a software application that is provided by server 212 or that is installed and which executes on electronic device 210).

As discussed previously, if the user encounters a problem or wants to contact sales, the user of electronic device 210 may provide an instruction to the financial software application to contact a representative associated with the financial software application, such as customer support or sales. For example, the user may activate a physical button or a virtual icon displayed on a screen.

In response to the instruction, the financial software application contacts the representative using a telephone number of the representative. For example, the financial software application (or a communication module in electronic device 210) may dial the telephone number or may use Voice over Internet Protocol (VoIP) to contact the representative.

This outgoing message may be conveyed to server 212 via network 312. After receiving the incoming message, a telephone connection via network 312 (and, more generally, a communication link) between electronic device 210 and server 212 is established (operation 222).

Then, electronic device 210 provides an identifier via the telephone connection with the representative to specify information about the user known to the provider of the financial software application. As noted previously, this identifier may be pre-existing or may have been dynamically generated. For example, server 212 may have provided the identifier to the financial software application via network 312 when the user activated a 'contact customer support' icon that is displayed on electronic device 210. Furthermore, the identifier may have been appended to the telephone number, and the financial software application may have parsed the telephone number and the identifier when contacting the representative. Alternatively, the telephone number and the identifier (along with any associated instructions, such as a 'pause') may have been provided by the financial software application to the representative, when they are then processed (for example, by server 212).

After receiving the identifier, server 212 may use the identifier to access the information. For example, using the identifier, server 212 may look up the information in a data structure. Then, the information, such as a recent transaction history of activities and operations performed by the user when using the financial software application, may be provided by server 212 to the representative to assist the representative in helping the user.

Note that information in system 300 may be stored at one or more locations in system 300 (i.e., locally or remotely). Moreover, because this data may be sensitive in nature, it may be encrypted. For example, stored data and/or data communicated via network 312 may be encrypted.

Figure 4:
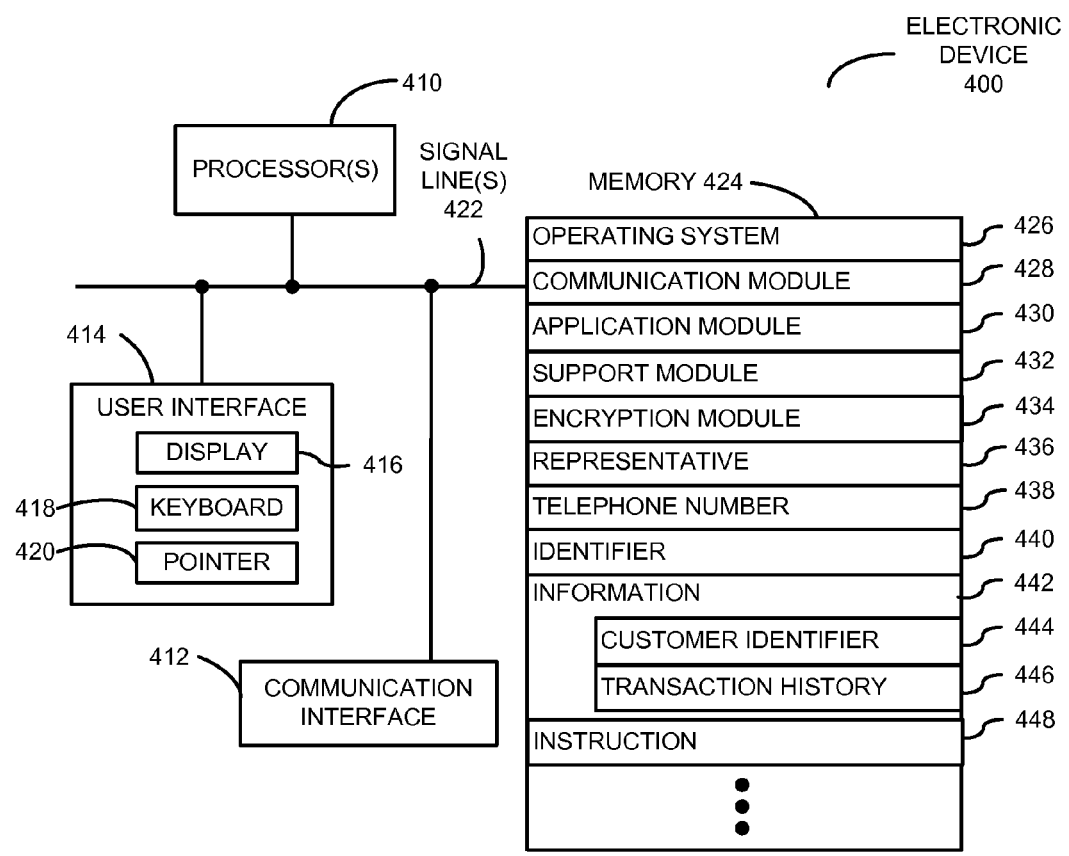
FIG. 4 is a block diagram illustrating an electronic device that performs the method of FIGS. 1 and 2 in accordance with an embodiment of the present disclosure.

FIG. 4 presents a block diagram illustrating an electronic device 400 that performs method 100 (FIGS. 1 and 2), such as electronic device 210 (FIGS. 2 and 3). Electronic device 400 includes one or more processing units or processors 410, a communication interface 412, a user interface 414, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in electronic device 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to electronic device 400.

Memory 424 may also include multiple program modules (or sets of instructions), including: application module 430 (or a set of instructions), support module 432 (or a set of instructions) and/or encryption module 434 (or a set of instructions). Note that one or more of these program modules (or sets of instructions) may constitute a computer-program mechanism.

During method 100 (FIGS. 1 and 2), a user of electronic device 400 may use application module 430. If the user encounters a problem or wants to contact sales, the user may provide an instruction 448 to application module 430 to contact a representative 436 associated with application module 430, such as customer support or sales. For example, the user may activate a physical button on keyboard 418 or a virtual icon displayed on display 416.

In response to instruction 448, support module 432 may contact representative 436 using a telephone number 438 of representative 436. For example, support module 432 may instruct communication module 428 to dial telephone number 438, and communication interface 412 may establish a telephone connection (and, more generally, a communication link) with representative 436.

Then, support module 432 provides an identifier 440 via the telephone connection with representative 436 to specify information 442 about the user known to the provider of application module 430. As noted previously, this identifier may be pre-existing or may have been dynamically generated. For example, identifier 440 may have been received from the provider when the user activated the physical button or the virtual icon.

Furthermore, identifier 440 may have been appended to telephone number 438. For example, identifier 440 may have been associated with telephone number 438 in a data structure, and support module 432 may have appended identifier 440 to telephone number 438 when contacting representative 436. This is shown in FIG. 5, which presents a data structure 500 that includes representative information 510. In particular, representative information 510-1 may include: telephone number 512-1, identifier(s) 514-1, and/or timestamp(s) 516-1, which may specify when one or more of identifiers 514-1 are valid.

Referring back to FIG. 4, identifier 440 may be used by representative 436 to access information 442, such as a customer identifier 444 of the user and/or recent transaction history 446 of activities and operations performed by the user when using application module 430, to assist representative 436 in helping the user.

Because information in electronic device 400 may be sensitive in nature, in some embodiments at least some of the data stored in memory 424 and/or at least some of the data communicated using communication module 428 is encrypted using encryption module 434.

Instructions in the various modules in memory 424 may be implemented in: a high-level procedural language, an object-oriented programming language, and/or in an assembly or machine language. Note that the programming language may be compiled or interpreted, e.g., configurable or configured, to be executed by the one or more processors 410.

Although electronic device 400 is illustrated as having a number of discrete items, FIG. 4 is intended to be a functional description of the various features that may be present in electronic device 400 rather than a structural schematic of the embodiments described herein. In practice, and as recognized by those of ordinary skill in the art, the functions of electronic device 400 may be distributed over a large number of servers or computers, with various groups of the servers or computers performing particular subsets of the functions. In some embodiments, some or all of the functionality of electronic device 400 may be implemented in one or more application-specific integrated circuits (ASICs) and/or one or more digital signal processors (DSPs).

In some embodiments one or more of the modules in memory 424 (such as application module 430) may be associated with and/or included in a financial application. This financial application may include: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial application may be associated with and/or include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), Tally.ERP (from Tally Solutions, Ltd., of Bangalore, India) and/or other payroll or accounting software capable of processing payroll information.

Electronic device 400, as well as computers and servers in system 300 (FIG. 3), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server and/or a client computer (in a client-server architecture). Moreover, network 312 (FIG. 3) may include: the Internet, World Wide Web (WWW), an intranet, a cellular-telephone network, LAN, WAN, MAN, or a combination of networks, or other technology enabling communication between computing systems.

System 300 (FIG. 3) and/or electronic device 400 may include fewer components or additional components. Moreover, two or more components may be combined into a single component, and/or a position of one or more components may be changed. In some embodiments, the functionality of system 300 (FIG. 3) and/or electronic device 400 may be implemented more in hardware and less in software, or less in hardware and more in software, as is known in the art.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for facilitating communication of information about a user of a software application, comprising:

receiving a user instruction to contact a representative associated with the software application, the instruction being provided to the user as part of the operation of the software application;

subsequent to receiving the user instruction, the software application generating, by a computer, a customized identifier, wherein the customized identifier encodes information about the user and their transaction history with the software application;

the software application appending, by the computer, the generated customized identifier to a telephone number associated with a representative of the software application;

and enabling contact with the representative from within the software application using the telephone number of the representative appended with the customized identifier, thereby facilitating access by the representative to information about the user and their transaction history with the software application.

2. The method of claim 1, wherein the identifier includes a numerical value; and wherein the identifier is provided after the telephone connection is established with the representative.

3. The method of claim 1, wherein the representative includes one of: customer support and sales associated with the software application.

4. The method of claim 1, wherein the information about the user includes a customer identifier and a transaction history.

5. The method of claim 1, wherein the method further comprises receiving the identifier, which is dynamically generated, from the provider of the software application in response to one of: the user accessing a document associated with the software application; and the user initiating a current session in which the user uses the software application.

6. A computer-program product for use in conjunction with an electronic device, the computer-program product comprising a non-transitory computer-readable storage medium and a computer-program mechanism embedded therein, to facilitate communication of information about a user of a software application, the computer-program mechanism including:

instructions for receiving a user instruction to contact a representative associated with the software application, the instruction being provided to the user as part of the operation of the software application;

instructions for the software application generating a customized identifier subsequent to receiving the user instruction, wherein the customized identifier encodes information about the user and their transaction history with the software application;

instructions for the software application appending the generated customized identifier to a telephone number associated with a representative of the software application;

and instructions for enabling contact with the representative from within the software application using the telephone number of the representative appended with the customized identifier, thereby facilitating access by the representative to information about the user and their transaction history with the software application.

7. The computer-program product of claim 6, wherein the identifier includes a numerical value; and wherein the identifier is provided after the telephone connection is established with the representative.

8. The computer-program product of claim 6, wherein the representative includes one of: customer support and sales associated with the software application.

9. The computer-program product of claim 6, wherein the information about the user includes a customer identifier and a transaction history.

10. The computer-program product of claim 6, wherein the computer-program mechanism further includes instructions for receiving the identifier, which is dynamically generated, from the provider of the software application in response to one of: the user accessing a document associated with the software application; and the user initiating a current session in which the user uses the software application.

11. An electronic device, comprising:
   a processor;
   memory; and
   a program module, wherein the program module is stored in the memory and configurable to be executed by the processor to provide an identifier to facilitate communication of information about a user of a software application, the program module including:
   instructions for receiving a user instruction to contact a representative associated with the software application, the instruction being provided to the user as part of the operation of the software application;
   instructions for the software application generating a customized identifier subsequent to receiving the user instruction, wherein the customized numerical value encodes information about the user and their transaction history with the software application;
   instructions for the software application appending the generated customized identifier to a telephone number associated with a representative of the software application;
   and
   instructions for enabling contact with the representative from within the software application using the telephone number of the representative appended with the customized identifier thereby facilitating access by the representative to information about the user and their recent transaction history with the software application.

12. The electronic device of claim 11, wherein the identifier includes a numerical value; and
   wherein the identifier is provided after the telephone connection is established with the representative.

13. The electronic device of claim 11, wherein the representative includes one of: customer support and sales associated with the software application.

14. The electronic device of claim 11, wherein the program module further includes instructions for receiving the identifier, which is dynamically generated, from the provider of the software application in response to one of: the user accessing a document associated with the software application; and the user initiating a current session in which the user uses the software application.

* * * * *